United States Patent
Marubashi

(10) Patent No.: US 11,612,188 B2
(45) Date of Patent: Mar. 28, 2023

(54) POWER SUPPLY UNIT FOR AEROSOL GENERATION DEVICE

(71) Applicant: Japan Tobacco Inc., Tokyo (JP)

(72) Inventor: Keiji Marubashi, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 0 days.

(21) Appl. No.: 17/489,807

(22) Filed: Sep. 30, 2021

(65) Prior Publication Data

US 2022/0095694 A1 Mar. 31, 2022

(30) Foreign Application Priority Data

Sep. 30, 2020 (JP) .............................. JP2020-166309

(51) Int. Cl.
*A24F 40/57* (2020.01)
*A24F 40/53* (2020.01)
*A24F 40/51* (2020.01)

(52) U.S. Cl.
CPC .............. *A24F 40/57* (2020.01); *A24F 40/51* (2020.01); *A24F 40/53* (2020.01)

(58) Field of Classification Search
CPC .......... A24F 40/57; A24F 40/53; A24F 40/51; A24F 40/50
See application file for complete search history.

(56) References Cited

U.S. PATENT DOCUMENTS

| | | | | |
|---|---|---|---|---|
| 2013/0319440 A1* | 12/2013 | Capuano | ............... | A61M 15/06 131/329 |
| 2018/0043114 A1* | 2/2018 | Bowen | ................ | A61M 15/003 |
| 2018/0199627 A1* | 7/2018 | Bowen | ...................... | A24D 3/17 |
| 2018/0263289 A1* | 9/2018 | Qiu | ......................... | A61M 15/06 |

(Continued)

FOREIGN PATENT DOCUMENTS

| | | |
|---|---|---|
| JP | 6728509 B1 | 7/2020 |
| WO | 2018/198153 A1 | 11/2018 |
| WO | 2019/146062 A1 | 8/2019 |

OTHER PUBLICATIONS

Notice of Reasons for Refusal dated Dec. 22, 2020, received for Japanese Application 2020-166309, 6 pages including English Translation.

(Continued)

*Primary Examiner* — Anthony Calandra
(74) *Attorney, Agent, or Firm* — Xsensus LLP

(57) ABSTRACT

A power supply unit for an aerosol generation device, includes: a power supply configured to discharge electricity to a first load that heats an aerosol source; a resistance element configured to be connected in series to the first load and configured to detect an electric resistance value of the first load; and a processing device. The processing device performs first discharging control of discharging electricity from the power supply to the first load to generate aerosol, and second discharging control of discharging electricity from the power supply to a series circuit formed of the first load and the resistance element to detect the electric resistance value of the first load; and in a specific period, other than a period when the first discharging control and the second discharging control are performed, the processing device performs third discharging control of discharging electricity from the power supply to the series circuit.

7 Claims, 9 Drawing Sheets

(56) References Cited

U.S. PATENT DOCUMENTS

2020/0245687 A1  8/2020  Tsuji et al.
2020/0352248 A1  11/2020  Yamada et al.

OTHER PUBLICATIONS

Decision to Grant mailed on Apr. 20, 2021, received for Japanese Application 2020-166309, 5 pages including English Translation.
European Communication dated Feb. 15, 2022, in corresponding European Application No. 21199796.0, 4 pp.
Communication pursuant to Article 94(3) EPC dated Feb. 25, 2022, in corresponding European Application No. 21199796.0, 7pp.

* cited by examiner

POWER SUPPLY UNIT FOR AEROSOL GENERATION DEVICE

CROSS-REFERENCE TO RELATED APPLICATIONS

This application is based upon and claims the benefit of priority from prior Japanese patent application No. 2020-166309, filed on Sep. 30, 2020, the entire contents of which are incorporated herein by reference.

TECHNICAL FIELD

The present invention relates to a power supply unit for an aerosol generation device.

SUMMARY OF INVENTION

An object of the present invention is to provide an aerosol generation device capable of preventing generation of aerosol that is mixed with water vapor.

According to an aspect of the present invention, there is provided a power supply unit for an aerosol generation device, including: a power supply configured to discharge electricity to a first load that heats an aerosol source; a resistance element configured to be connected in series to the first load and configured to detect an electric resistance value of the first load; and a processing device, where: the processing device performs first discharging control of discharging electricity from the power supply to the first load in order to generate aerosol, and second discharging control of discharging electricity from the power supply to a series circuit formed of the first load; and the resistance element in order to detect the electric resistance value of the first load, and in a specific period, other than a period when the first discharging control and the second discharging control are performed, the processing device performs third discharging control of discharging electricity from the power supply to the series circuit.

According to the aspect of the present invention, it is possible to provide the aerosol generation device capable of preventing generation of aerosol that is mixed with water vapor.

DESCRIPTION OF EMBODIMENTS

Hereinafter, an aerosol generation device 1 that is an embodiment of an aerosol generation device of the present invention will be described with reference to FIGS. 1 to 5.

(Aerosol Generation Device)

Figure 1:
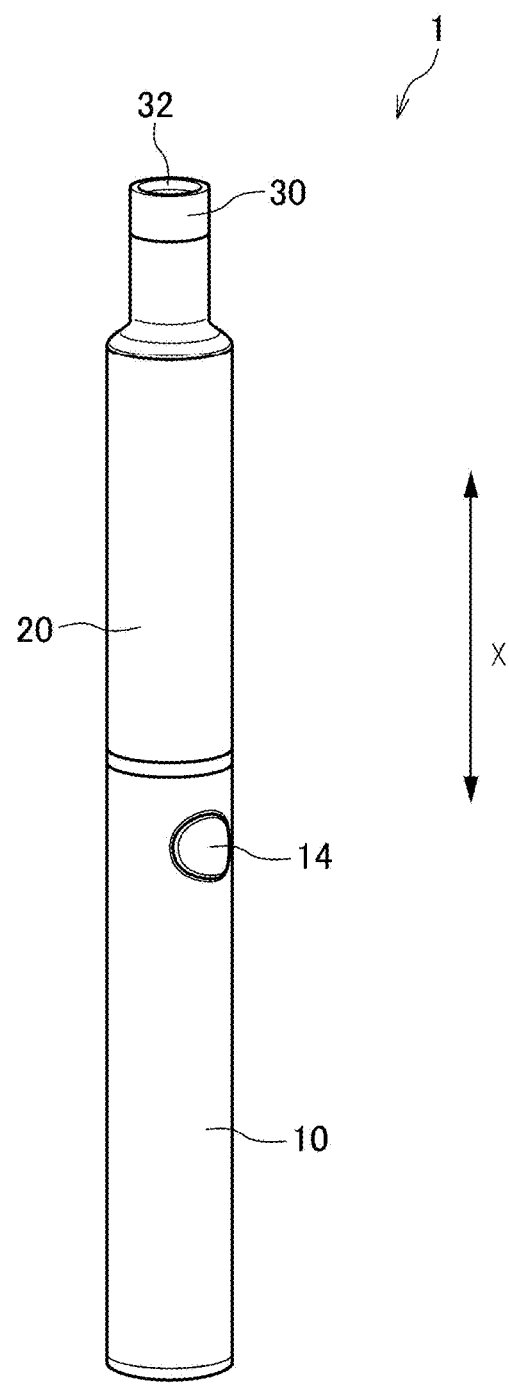
FIG. 1 is a perspective view schematically showing a schematic configuration of an aerosol generation device.
Figure 2:
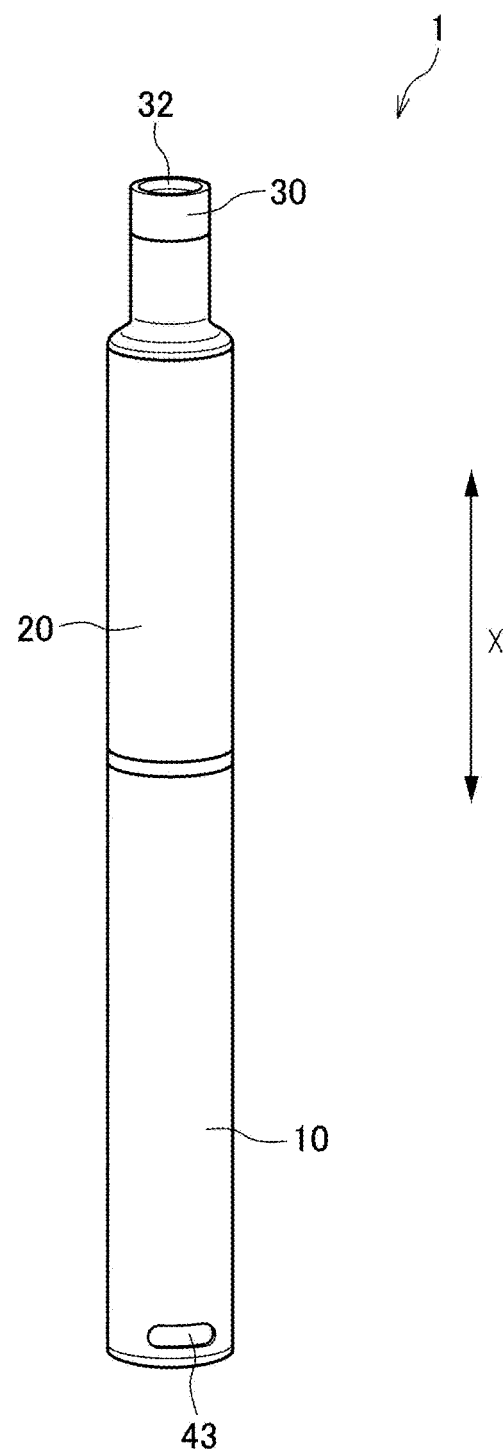
FIG. 2 is another perspective view of the aerosol generation device shown in FIG. 1.

The aerosol generation device 1 is an instrument for generating aerosol to which a flavor component is added without burning and allowing the aerosol to be inhaled, and has a rod shape that extends along a predetermined direction (hereinafter referred to as a longitudinal direction X) as shown in FIGS. 1 and 2.

In the aerosol generation device 1, a power supply unit 10, a first cartridge 20, and a second cartridge 30 are provided in such an order along the longitudinal direction X.

The first cartridge 20 is attachable to and detachable from (in other words, replaceable relative to) the power supply unit 10.

The second cartridge 30 is attachable to and detachable from (in other words, replaceable relative to) the first cartridge 20.

Figure 3:
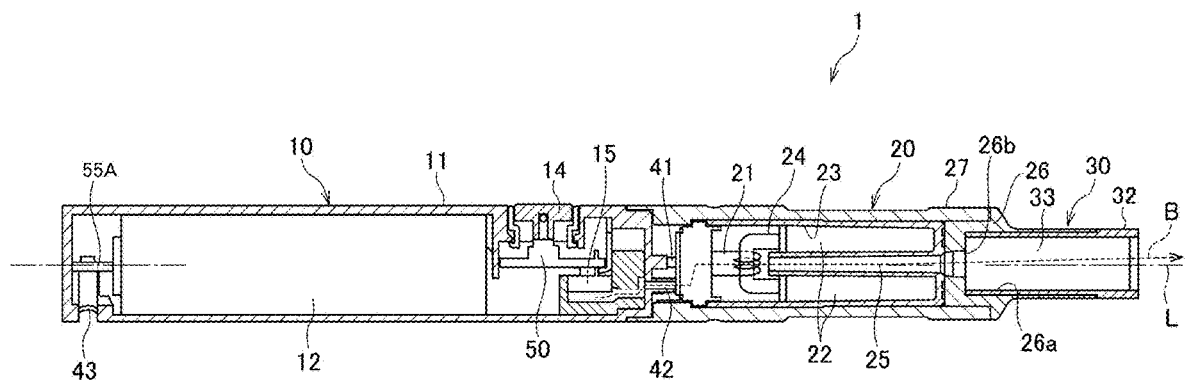
FIG. 3 is a cross-sectional view of the aerosol generation device shown in FIG. 1.

As shown in FIG. 3, the first cartridge 20 is provided with a first load 21. As shown in FIG. 1, an overall shape of the aerosol generation device 1 is not limited to a shape in which the power supply unit 10, the first cartridge 20, and the second cartridge 30 are arranged in a line.

As long as the first cartridge 20 and the second cartridge 30 are replaceable relative to the power supply unit 10, any shape such as a substantially box shape can be adopted.

(Power Supply Unit)

Figure 4:
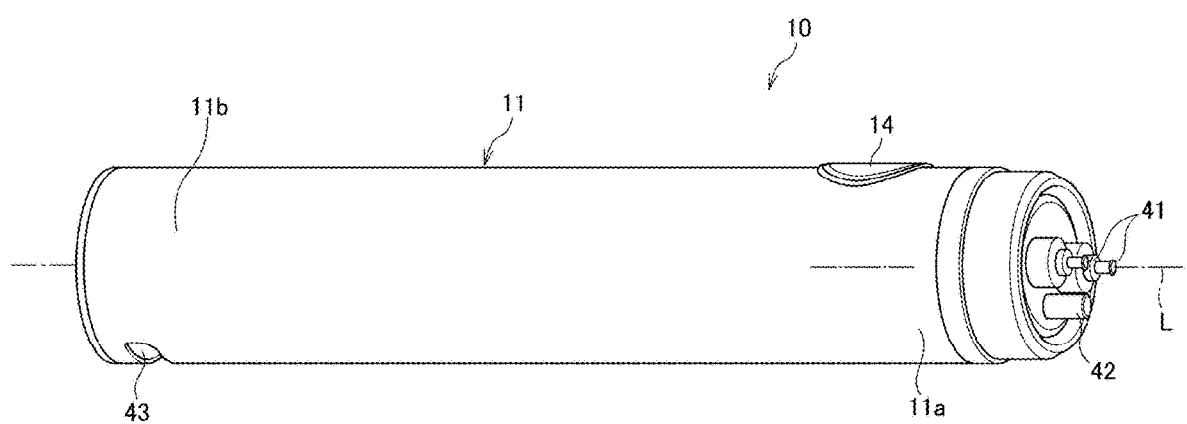
FIG. 4 is a perspective view of a power supply unit of the aerosol generation device shown in FIG. 1.
Figure 5:
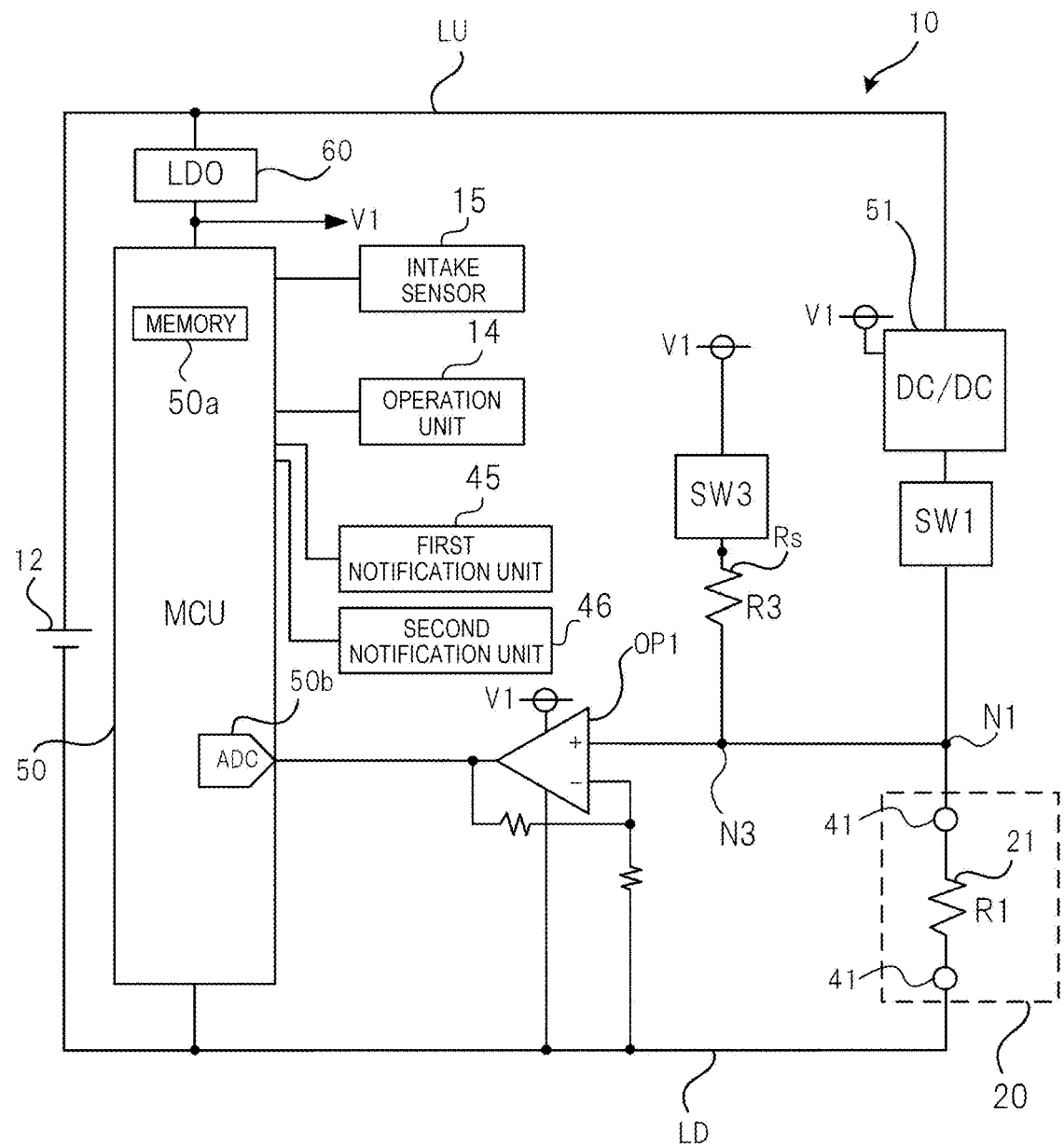
FIG. 5 is a schematic view showing an electrical detailed configuration example of inside of the aerosol generation device shown in FIG. 1.

As shown in FIGS. 3, 4, and 5, inside a cylindrical power supply unit case 11, the power supply unit 10 accommodates a power supply 12, a charging IC 55A, a micro controller unit (MCU) 50, an intake sensor 15, a first notification unit 45, and a second notification unit 46.

The power supply 12 is a rechargeable secondary battery, an electric double layer capacitor, or the like, and is preferably a lithium-ion secondary battery. An electrolyte of the power supply 12 may be formed of one or a combination of a gel-like electrolyte, an electrolytic solution, a solid electrolyte, and an ionic liquid.

As shown in FIG. 5, the MCU 50 is connected to the intake sensor 15, an operation unit 14, the first notification unit 45, and the second notification unit 46, and performs various types of control of the aerosol generation device 1.

Specifically, the MCU 50 is mainly constituted by a processor, and further includes a memory 50a that is constituted by a storage medium such as a random access memory (RAM) necessary for an operation of the processor and a read only memory (ROM) that stores various types of information. Specifically, the processor in the present specification is an electric circuit in which circuit elements such as semiconductor elements are combined.

As shown in FIG. 4, a discharging terminal 41 is provided on a top portion 11a positioned on one end side (the side of the first cartridge 20) of the power supply unit case 11 in the longitudinal direction X. The discharging terminal 41 is provided so as to protrude from an upper surface of the top portion 11a toward the first cartridge 20, and is configured to be electrically connectable to the first load 21 of the first cartridge 20.

In addition, an air supply unit 42 that supplies air to the first load 21 of the first cartridge 20 is provided in the vicinity of the discharging terminal 41 on the upper surface of the top portion 11*a*.

A charging terminal 43 that can be electrically connected to an external power supply (not shown) is provided in a bottom portion 11*b* positioned on the other end side (a side opposite to the first cartridge 20) of the power supply unit case 11 in the longitudinal direction X. The charging terminal 43 is provided in a side surface of the bottom portion 11*b*, and can be connected to, for example, a universal serial bus (USB) terminal, a micro USB terminal, or the like.

The charging terminal 43 may be a power reception unit that can receive power transmitted from the external power supply in a wireless manner. In such a case, the charging terminal 43 (power reception unit) may be constituted by a power reception coil. A method of wireless power transfer in this case may be an electromagnetic induction type method, a magnetic resonance type method, or a combination of the electromagnetic induction type method and the magnetic resonance type method. The charging terminal 43 may be a power reception unit that can receive power transmitted from the external power supply in a contactless manner. As another example, the charging terminal 43 can be connected to a USB terminal or a micro USB terminal, and may include the power reception unit described above.

The power supply unit case 11 is provided with the operation unit 14 that can be operated by a user on the side surface of the top portion 11*a* so as to face a side opposite to the charging terminal 43. The operation unit 14 is constituted by a button-type switch, a touch panel, or the like. When a predetermined activation operation is performed by the operation unit 14 in a state where the power supply unit 10 is power-off, the operation unit 14 outputs an activation command of the power supply unit 10 to the MCU 50. When the MCU 50 acquires the activation command, the MCU 50 activates the power supply unit 10.

As shown in FIG. 3, the intake sensor 15 that detects a puff (inhalation) operation is provided in the vicinity of the operation unit 14. The power supply unit case 11 is provided with an air intake port (not shown) through which outside air is taken into the power supply unit case 11. The air intake port may be provided around the operation unit 14, or may be provided around the charging terminal 43.

The intake sensor 15 is configured to output a value of a pressure (internal pressure) change in the power supply unit 10 caused by inhalation of the user through an inhalation port 32 described later. The intake sensor 15 is, for example, a pressure sensor that outputs an output value (for example, a voltage value or a current value) corresponding to internal pressure that changes in accordance with a flow rate of air inhaled from an air intake port toward the inhalation port 32. The intake sensor 15 may output an analog value, or may output a digital value converted from the analog value.

In order to compensate for pressure to be detected, the intake sensor 15 may include a temperature sensor that detects a temperature (outside air temperature) of an environment in which the power supply unit 10 is placed. The intake sensor 15 may be constituted by a condenser microphone or the like instead of a pressure sensor.

When the puff operation is performed and the output value of the intake sensor 15 is equal to or higher than an output threshold value, the MCU 50 determines that an aerosol generation request (an atomization command of an aerosol source 22 to be described later) has been made, and thereafter, when the output value of the intake sensor 15 falls below the output threshold value, the MCU 50 determines that the aerosol generation request has ended. In the aerosol generation device 1, for a purpose of preventing overheating of the first load 21 or the like, when a period during which the aerosol generation request is made reaches an upper limit value $t_{upper}$ (for example, 2.4 seconds), it is determined that the aerosol generation request has ended regardless of the output value of the intake sensor 15.

Instead of the intake sensor 15, the aerosol generation request may be detected based on an operation of the operation unit 14. For example, when the user performs a predetermined operation on the operation unit 14 in order to start inhaling aerosol, the operation unit 14 may output a signal indicating the aerosol generation request to the MCU 50.

The charging IC 55A is disposed close to the charging terminal 43, and controls charging of power input from the charging terminal 43 to the power supply 12. The charging IC 55A may be disposed in the vicinity of the MCU 50.

(First Cartridge)

As shown in FIG. 3, inside a cylindrical cartridge case 27, the first cartridge 20 includes a reservoir 23 constituting a storage portion that stores the aerosol source 22, the first load 21 constituting an atomizer that atomizes the aerosol source 22 so as to generate aerosol, a wick 24 that draws the aerosol source 22 from the reservoir 23 to a position of the first load 21, an aerosol flow path 25 constituting a cooling passage that sets a particle size of the aerosol generated by atomization of the aerosol source 22 to a size suitable for inhalation, and an end cap 26 that accommodates a part of the second cartridge 30.

The reservoir 23 is partitioned to surround a periphery of the aerosol flow path 25, and stores the aerosol source 22. A porous body, such as a resin web or cotton, may be accommodated in the reservoir 23, and the aerosol source 22 may be impregnated in the porous body. The reservoir 23 may only store the aerosol source 22 without accommodating the porous body such as the resin web or cotton. The aerosol source 22 includes a liquid other than water, such as glycerin or propylene glycol, and water. A proportion of water in the aerosol source 22 is, for example, 10% or less of the aerosol source 22, which is sufficiently small.

The wick 24 is a liquid holding member that draws the aerosol source 22 from the reservoir 23 to the position of the first load 21 by using a capillary phenomenon. The wick 24 constitutes a holding portion that holds the aerosol source 22 supplied from the reservoir 23 at a position where the aerosol source 22 can be atomized by the first load 21. The wick 24 is formed of, for example, glass fiber or porous ceramic.

The first load 21 atomizes the aerosol source 22 by heating the aerosol source 22 without burning by power supplied from the power supply 12 via the discharging terminal 41. In principle, as the power supplied from the power supply 12 to the first load 21 increases, an amount of the atomized aerosol source increases. The first load 21 is constituted by an electric heating wire (coil) wound at a predetermined pitch.

The first load 21 may be any element that can generate aerosol by heating the aerosol source 22 and atomizing the aerosol source 22. The first load 21 is, for example, a heat generating element. Examples of the heat generating element include a heat generating resistor, a ceramic heater, an induction heating type heater, and the like.

As the first load 21, a load in which a temperature and an electric resistance value have a correlation is used. As the first load 21, for example, a load having positive temperature coefficient (PTC) characteristics in which an electric resistance value increases as a temperature increases is used. As the first load 21, for example, a load having negative temperature coefficient (NTC) characteristics in which an electric resistance value decreases as a temperature increases may be used.

The aerosol flow path 25 is downstream of the first load 21 and is provided on a center line L of the power supply unit 10. The end cap 26 includes: a cartridge accommodating portion 26a that accommodates a part of the second cartridge 30; and a communication path 26b that communicates the aerosol flow path 25 and the cartridge accommodating portion 26a.

(Second Cartridge)

The second cartridge 30 stores the flavor source 33. The second cartridge 30 is detachably accommodated in the cartridge accommodating portion 26a provided in the end cap 26 of the first cartridge 20. An end portion, which is located on a side opposite to the side of the first cartridge 20, of the second cartridge 30 serves as the user inhalation port 32. The inhalation port 32 is not limited to be formed integrally with the second cartridge 30, and may also be detachable from the second cartridge 30. By forming the inhalation port 32 separately from the power supply unit 10 and the first cartridge 20 in this way, the inhalation port 32 can be kept hygienic.

The second cartridge 30 adds a flavor component to the aerosol by passing the aerosol generated by atomizing the aerosol source 22 by the first load 21 through the flavor source 33. Chopped tobacco or a molded body obtained by molding a tobacco raw material into particles can be used as a raw material piece that constitutes the flavor source 33. The flavor source 33 may also be constituted by a plant other than tobacco (for example, mint, Chinese herb, herb, or the like). A fragrance such as menthol may also be added to the flavor source 33.

In the aerosol generation device 1, the aerosol source 22 and the flavor source 33 can generate aerosol to which a flavor component is added. That is, the aerosol source 22 and the flavor source 33 constitute an aerosol generation source that generates the aerosol.

The aerosol generation source of the aerosol generation device 1 is a portion that is replaced and used by the user. The portion is provided to the user, for example, as a set of one first cartridge 20 and one or a plurality of (for example, five) second cartridges 30. The first cartridge 20 and the second cartridge 30 may be integrated into one cartridge.

In the aerosol generation device 1 configured as described above, as indicated by an arrow B in FIG. 3, air that flows in from the air intake port (not shown) provided in the power supply unit case 11 passes through the vicinity of the first load 21 of the first cartridge 20 from the air supply unit 42. The first load 21 atomizes the aerosol source 22 drawn from the reservoir 23 by the wick 24. Aerosol generated by atomization flows through the aerosol flow path 25 together with the air that flows in from the intake port, and is supplied to the second cartridge 30 via the communication path 26b. The aerosol supplied to the second cartridge 30 is passed through the flavor source 33 so as to add a flavor component thereto, and is supplied to the inhalation port 32.

The aerosol generation device 1 is also provided with the first notification unit 45 and the second notification unit 46 that notify the user of various types of information (see FIG. 5). The first notification unit 45 is configured to perform notification that acts on a tactile sense of the user, and is constituted by a vibrating element such as a vibrator. The second notification unit 46 is configured to perform notification that acts on a visual sense of the user, and is constituted by a light-emitting element such as a light emitting diode (LED). As the notification unit that notifies various types of information, a sound output element may be further provided to perform notification that acts on an auditory sense of the user. The first notification unit 45 and the second notification unit 46 may be provided in any of the power supply unit 10, the first cartridge 20, and the second cartridge 30, and are preferably provided in the power supply unit 10. For example, a configuration in which a periphery of the operation unit 14 is light-transmissive and light is emitted by a light-emitting element such as an LED is employed.

(Details of Power Supply Unit)

FIG. 5 shows an electrical detailed configuration example of inside of the power supply unit 10 in a state where the first cartridge 20 is mounted. As shown in FIG. 5, the power supply unit 10 includes the power supply 12, the MCU 50, a low drop out (LDO) regulator 60, a DC/DC converter 51, a switch SW1, a switch SW3, an operational amplifier OP1, an analog-to-digital converter (hereinafter referred to as ADC) 50b, and a resistance element Rs.

The resistance element described in the present specification may be an element having a fixed electric resistance value, and is, for example, a resistor, a diode, or a transistor. In the example shown in FIG. 5, the resistance element Rs is a resistor.

The switch described in the present specification is a switching element such as a transistor that switches between disconnection and conduction of a wiring path. In the example shown in FIG. 5, the switch SW1 and the switch SW3 are transistors.

The LDO regulator 60 is connected to a main positive bus LU connected to a positive electrode of the power supply 12. The MCU 50 is connected to the LDO regulator 60 and a main negative bus LD connected to a negative electrode of the power supply 12. The MCU 50 is also connected to the switch SW1 and the switch SW3, and controls the same. The LDO regulator 60 steps down a voltage from the power supply 12 and outputs the stepped-down voltage. An output voltage V1 of the LDO regulator 60 is also used as an operation voltage of each of the MCU 50, the DC/DC converter 51, and the operational amplifier OP1.

The DC/DC converter 51 is connected to the main positive bus LU. The first load 21 is connected to the main negative bus LD. The switch SW1 is connected between the DC/DC converter 51 and the first load 21. Hereinafter, an electric resistance value of the first load 21 is referred to as R1.

An inverting input terminal of the operational amplifier OP1 is connected to each of an output terminal of the operational amplifier OP1 and the main negative bus LD via a resistance element. A non-inverting input terminal of the operational amplifier OP1 is connected to a connection node N1 between the switch SW1 and the first load 21. A positive power supply terminal of the operational amplifier OP1 is connected to a power supply line that supplies the output voltage V1 of the LDO regulator 60. A negative power supply terminal of the operational amplifier OP1 is connected to the main negative bus LD. Therefore, a range of a differential input voltage that can be amplified by the operational amplifier OP1 is a range from 0V to the output voltage V1.

The ADC 50b is connected to the output terminal of the operational amplifier OP1. The ADC 50b may be provided outside the MCU 50.

The resistance element Rs is connected to the non-inverting input terminal of the operational amplifier OP1. A connection node N3 between the resistance element Rs and the non-inverting input terminal of the operational amplifier OP1 is connected to the connection node N1. Hereinafter, an electric resistance value of the resistance element Rs is referred to as R3.

The switch SW3 is connected between the power supply line that supplies the output voltage V1 of the LDO regulator 60 and the resistance element Rs.

The processor of the MCU 50 is configured to be capable of acquiring a temperature of the first load 21. The temperature of the first load 21 can be used to prevent overheating of the first load 21 or the aerosol source 22, and to precisely control an amount of the aerosol source 22 atomized by the first load 21.

(MCU)

Next, a function of the MCU 50 will be described. The MCU 50 includes a temperature detection unit, a power control unit, and a notification control unit as functional blocks implemented by executing programs stored in a ROM by the processor.

The temperature detection unit acquires the temperature of the first load 21 based on output of the ADC 50b.

The temperature detection unit performs second discharging control of discharging electricity from the power supply 12 to a series circuit formed of the first load 21 and the resistance element Rs in order to detect the electric resistance value R1 of the first load 21. In the second discharging control, the temperature detection unit forms a first state by controlling the switch SW1 to be in a cut-off state and controlling the switch SW3 to be in a conductive state. The first state is a state where the power supply line that supplies the output voltage V1 and the main negative bus LD are connected by the series circuit formed of the resistance element Rs and the first load 21. In the first state, the temperature detection unit acquires an output value of the ADC 50b (value of a voltage applied to the first load 21), and acquires the temperature of the first load 21 based on the output value. Specifically, the output value corresponds to a value obtained by amplifying, by the operational amplifier OP1 with a predetermined amplification factor, the differential input voltage of the operational amplifier OP1 represented by $\{R1/(R3+R1)\} \times V1$. As described above, since the first load 21 is specified to have a correlation between the temperature and the electric resistance value, the electric resistance value of the first load 21 can be derived based on the output value of the ADC 50b in the first state, and the temperature of the first load 21 can be acquired based on the electric resistance value.

The notification control unit controls the first notification unit 45 and the second notification unit 46 to notify various types of information. For example, in response to detection of replacement timing of the second cartridge 30, the notification control unit controls at least one of the first notification unit 45 and the second notification unit 46 to perform a notification that prompts replacement of the second cartridge 30. The notification control unit is not limited to cause the notification that prompts the replacement of the second cartridge 30 to be performed, and may also cause a notification that prompts replacement of the first cartridge 20, a notification that prompts replacement of the power supply 12, a notification that prompts charging of the power supply 12, and the like to be performed.

The power control unit performs first discharging control of discharging electricity from the power supply 12 to the first load 21 in order to generate aerosol in response to a signal indicating the aerosol generation request output from the intake sensor 15. In the first discharging control, the power control unit forms a second state where the switch SW1 is in a conductive state and the switch SW3 is in a cut-off state, and causes power to be supplied from the DC/DC converter 51 to the first load 21. In a state where first discharging control is performed, the temperature of the first load 21 is increased from room temperature (room temperature defined by Japanese Industrial Standards) to a high temperature of, for example, about 200° C.

In the power supply unit 10, the electric resistance value R3 of the resistance element Rs and the voltage (output voltage V1) supplied to the series circuit are determined in such a manner that the temperature of the first load 21 is in a range of 30° C. or more and less than 100° C. when electricity is discharged to the series circuit formed of the resistance element Rs and the first load 21 in a state where the temperature of the first load 21 is sufficiently lower than a temperature at the time of aerosol generation (for example, a state of room temperature). As an example, the electric resistance value R3 of the resistance element Rs is a relatively small value of about 10Ω.

If a large amount of power is supplied to the first load 21 when the temperature of the first load 21 is detected, the first load 21 may be heated. Therefore, at the time of temperature detection, the electric resistance value R3 of the resistance element Rs of the series circuit is generally set to a sufficiently large value such as 100Ω. On the other hand, in the power supply unit 10 of the present embodiment, the electric resistance value R3 of the resistance element Rs is reduced to about 10Ω, so that the temperature of the first load 21 is slightly increased when the second discharging control is performed in a state where the first load 21 is at room temperature. When it is assumed that a general lithium ion battery is used as the power supply 12, the electric resistance value R3 is set to be equal to or more than 1 time and less than 30 times, preferably equal to or more than 5 times and less than 20 times the electric resistance value R1 of the first load 21 at room temperature, and thus, when the second discharging control is performed in the state where the first load 21 is at room temperature, it is easy to bring the temperature of the first load 21 into the range of 30° C. or more and less than 100° C. When the electric resistance value R3 is set to the small value as described above, temperature detection resolution of the first load 21 can be increased.

The MCU 50 performs third discharging control of discharging electricity from the power supply 12 to the series circuit in a specific period other than a period when the first discharging control and the second discharging control are performed. The third discharging control is the same as the second discharging control despite a purpose thereof is different.

The third discharging control is performed to evaporate water present in the vicinity of the first load 21. In the vicinity of the first load 21, there is water absorbed by the first load 21, water contained in the aerosol source 22 drawn to the wick 24, water in space where the first load 21 is provided, and the like. As described above, even if the third discharging control that has the same contents as those of the second discharging control is performed, the temperature of the first load 21 changes only from room temperature to the range of 30° C. or more and less than 100° C. However, the water present in the vicinity of the first load 21 can be evaporated by spending a certain amount of time at a temperature in this range.

Timing when the temperature of the first load 21 is detected (timing when the second discharging control is performed) is a period when the first discharging control is performed, a period immediately after an end of the period, and the like. At such timing, the temperature of the first load 21 is sufficiently higher than the above range. Therefore, an increase in the temperature of the first load 21 caused by the second discharging control can be ignored.

(Operation of Aerosol generation device)

Figure 6:
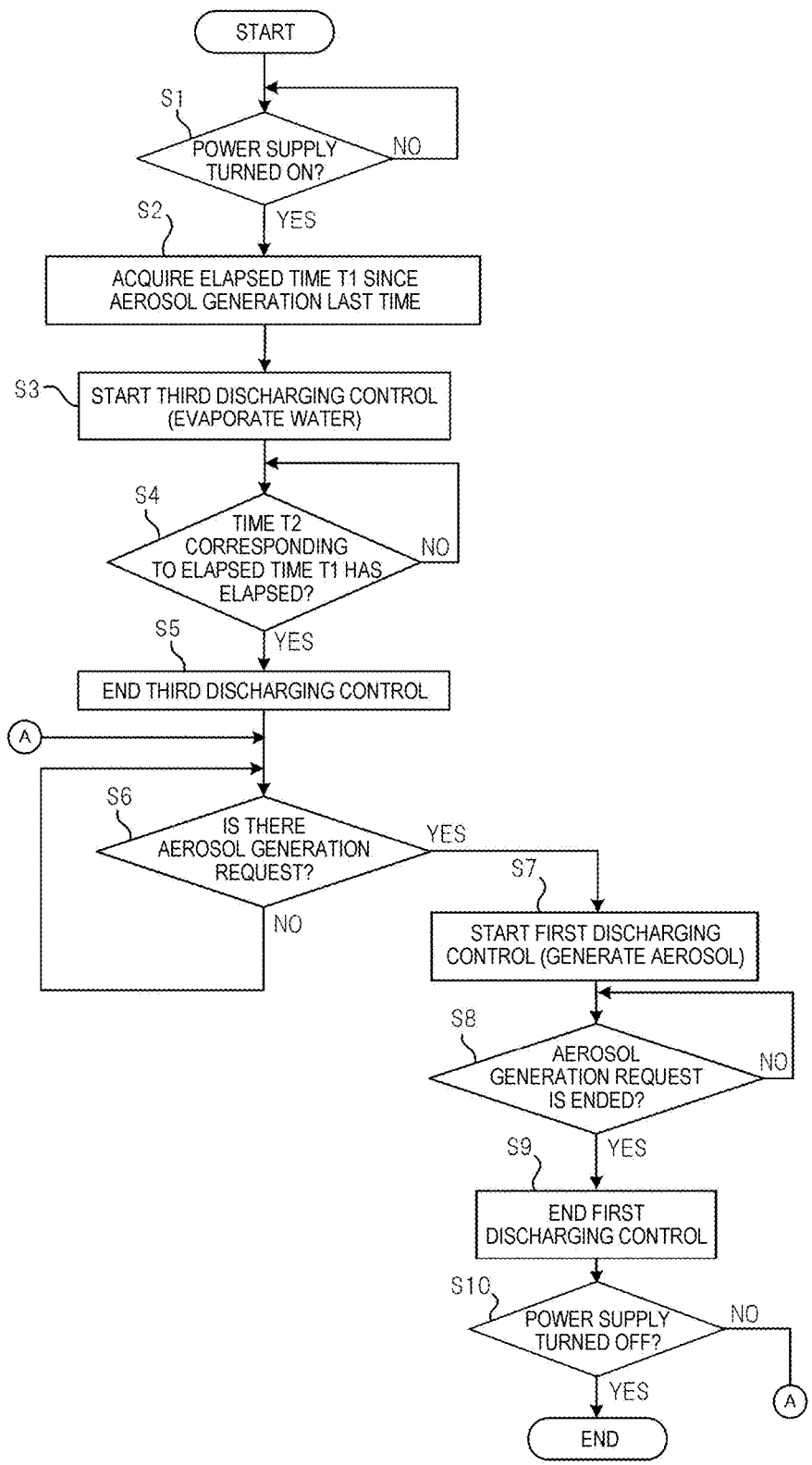
FIG. 6 is a flowchart for explaining an operation of the aerosol generation device shown in FIG. 1.

FIG. 6 is a flowchart for explaining an operation of the aerosol generation device 1 shown in FIG. 1. When the operation unit 14 is operated and the power supply of the power supply unit 10 is turned on (step S1: YES), the MCU 50 acquires an elapsed time T1 since aerosol generation last time (step S2). The MCU 50 stores an aerosol generation end time in the memory 50a when the first discharging control that is started in response to the aerosol generation request is ended. In step S2, the MCU 50 acquires a difference between the aerosol generation end time stored in the memory 50a and a current time as the elapsed time T1.

When the power supply of the power supply unit 10 is turned on, the MCU 50 starts the third discharging control (step S3). Thereafter, when an elapsed time since the start of the third discharging control reaches a time T2 corresponding to the elapsed time T1 acquired in step S2 (step S4: YES), the MCU 50 ends the third discharging control (step S5). The time T2 is set to a larger value as the elapsed time T1 becomes longer.

After step S5, when the aerosol generation request is started (step S6: YES), the MCU 50 starts the first discharging control (step S7). Thereafter, when the aerosol generation request is ended (step S8: YES), the MCU 50 ends the first discharging control (step S9), and stores the aerosol generation end time in the memory 50a.

For example, the MCU 50 alternately repeats the first discharging control and the second discharging control from step S7 to step S9. As a result, while the first load 21 is heated, prevention of overheating of the first load 21 by detecting the temperature of the first load 21, adjustment of an aerosol generation amount by controlling power discharged to the first load 21, and the like are performed. It is desirable that the MCU 50 does not perform the first discharging control and the second discharging control in a period other than the period from step S7 to step S9.

After step S9, the MCU 50 ends the process if the power supply of the aerosol generation device 1 is turned off, and returns the process to step S6 if the power supply is not turned off.

As described above, according to the aerosol generation device 1, the third discharging control is performed in the specific period when the aerosol generation and the detection of the electric resistance value R1 of the first load 21 are not performed (specifically, a period from activation of the power supply unit 10 to start of aerosol generation for a first time (first discharging control)). Therefore, by the third discharging control, it is possible to slightly heat the first load 21 and evaporate the water present in the vicinity of the first load 21. By evaporating the water in the vicinity of the first load 21, the aerosol generated when the first discharging control is performed thereafter can be prevented from containing a large amount of water, and thus a decrease in a flavor can be prevented. In addition, water can be evaporated during the period from the activation of the power supply unit 10 to the start of the aerosol generation for the first time. Therefore, a sufficient flavor can be provided to the user from a first inhalation after power is turned on.

In the aerosol generation device 1, the temperature of the first load 21 is in the range of 30° C. or more and less than 100° C. during a period from step S3 to step S5, and is not a higher temperature as compared with a temperature when the first discharging control is performed. Therefore, the water in the vicinity of the first load 21 can be evaporated without awareness of the user. In addition, it is possible to prevent the temperature of the power supply unit 10 from being increased when no inhalation is performed, and thus provide a sense of security to the user.

According to the aerosol generation device 1, the water in the vicinity of the first load 21 can be evaporated while the user is preparing for an inhalation after the power supply unit 10 is powered on. Therefore, the water in the vicinity of the first load 21 can be evaporated without awareness of the user.

In a state where the power supply unit 10 is not activated, it is considered that the aerosol generation device 1 is left for a certain period of time. In other words, in this state, there is a high possibility that an amount of water in the vicinity of the first load 21 is increased due to moisture outside the aerosol generation device 1, saliva of the user entering from the inhalation port 32, or the like. Therefore, it is particularly effective to evaporate the water in the vicinity of the first load 21 after the power supply unit 10 is activated.

Even if there is water that cannot be completely evaporated in the third discharging control in the period from step S3 to step S5, the water is evaporated in the subsequent first discharging control. Therefore, at the time of aerosol generation for the second and subsequent times after the power supply unit 10 is activated, almost no water is present in the vicinity of the first load 21. Therefore, by not performing the third discharging control since the first aerosol generation is completed after the power supply unit 10 is activated, power consumption can be reduced when no inhalation is performed.

According to the aerosol generation device 1, a time of performing the third discharging control is controlled based on the elapsed time T1 between a time point when aerosol generation of a last time is ended and a time point when the third discharging control is started. As a value of the elapsed time T1 becomes larger, there is a higher possibility that a large amount of water is present in the vicinity of the first load 21. In this way, by determining the time of performing the third discharging control based on the elapsed time T1 that is highly correlated with the amount of water in the vicinity of the first load 21, it is possible to perform appropriate discharging according to the amount of water in the vicinity of the first load 21, and thus it is possible to efficiently use power.

A time from step S3 to step S5 shown in FIG. 6 is a value based on the elapsed time T1 (=time T2), but is not limited thereto, and the time may also be a fixed value that is experimentally determined (for example, 10 seconds to 15 seconds). A possible range of the time T2 may be, for example, 10 seconds to 15 seconds, and is not limited thereto.

(First Modification of Operation of Aerosol Generation Device)

Figure 7:
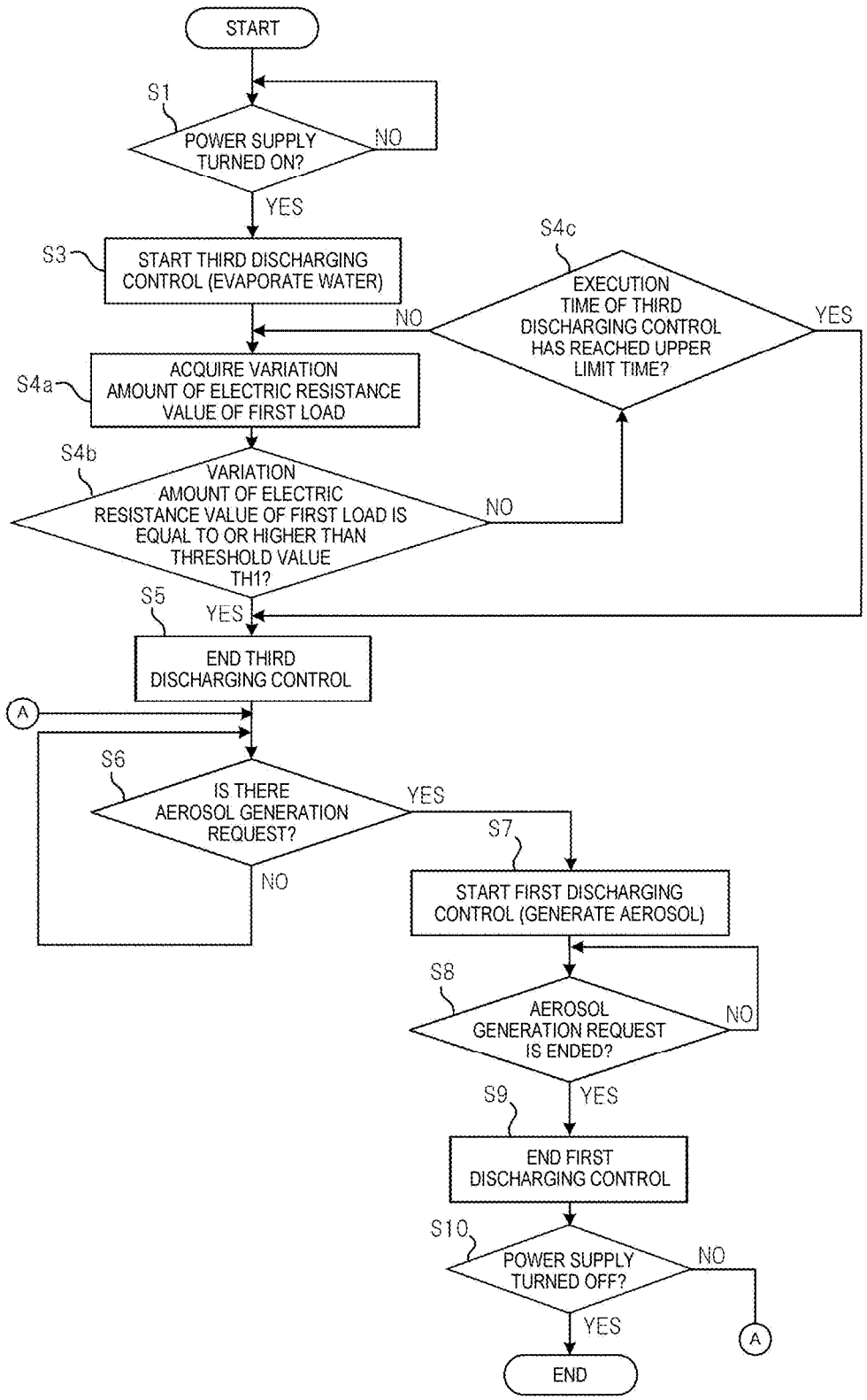
FIG. 7 is a flowchart for explaining a first modification of the operation of the aerosol generation device shown in FIG. 1.

FIG. 7 is a flowchart for explaining a first modification of the operation of the aerosol generation device 1 shown in FIG. 1. The flowchart shown in FIG. 7 is the same as FIG. 6 except that step S2 is deleted and step S4 is changed to step S4a, step S4b, and step S4c. Hereinafter, the changes will be mainly described.

When the power supply of the power supply unit 10 is turned on (step S1: YES), the MCU 50 starts the third discharging control (step S3). Thereafter, the MCU 50 acquires the electric resistance value of the first load 21 every time when a unit time has elapsed based on the output of the ADC 50b, and acquires a variation amount (absolute value) of the electric resistance value during the unit time (step S4a). Then, the MCU 50 determines whether the variation amount of the electric resistance value of the first load 21 is equal to or higher than a threshold value TH1 (step S4b).

When the variation amount is less than the threshold value TH1 (step S4b: NO), the MCU 50 determines whether an elapsed time since the start of the third discharging control reaches a predetermined upper limit time (step S4c). When the elapsed time since the start of the third discharging control does not reach the upper limit time (step S4c: NO), the MCU 50 returns the process to step S4a.

When the elapsed time since the start of the third discharging control reaches the upper limit time (step S4c: YES), the MCU 50 ends the third discharging control in step S5. When the variation amount is equal to or higher than the threshold value TH1 (step S4b: YES), the MCU 50 also ends the third discharging control in step S5.

When the third discharging control is performed, the temperature of the first load 21 is increased and the water in the vicinity of the first load 21 is evaporated, the temperature of the first load 21 is decreased due to heat of vaporization caused by the evaporation. Therefore, the electric resistance value of the first load 21 greatly varies before and after the evaporation of the water. Therefore, as in the operation of FIG. 7, by ending the third discharging control when the variation amount of the electric resistance value of the first load 21 becomes equal to or higher than the threshold value TH1 (in other words, when the water is evaporated), it is possible to prevent the discharging from being continued in a state where there is no water and thus reduce power consumption.

(Second Modification of Operation of Aerosol Generation Device)

Figure 8:
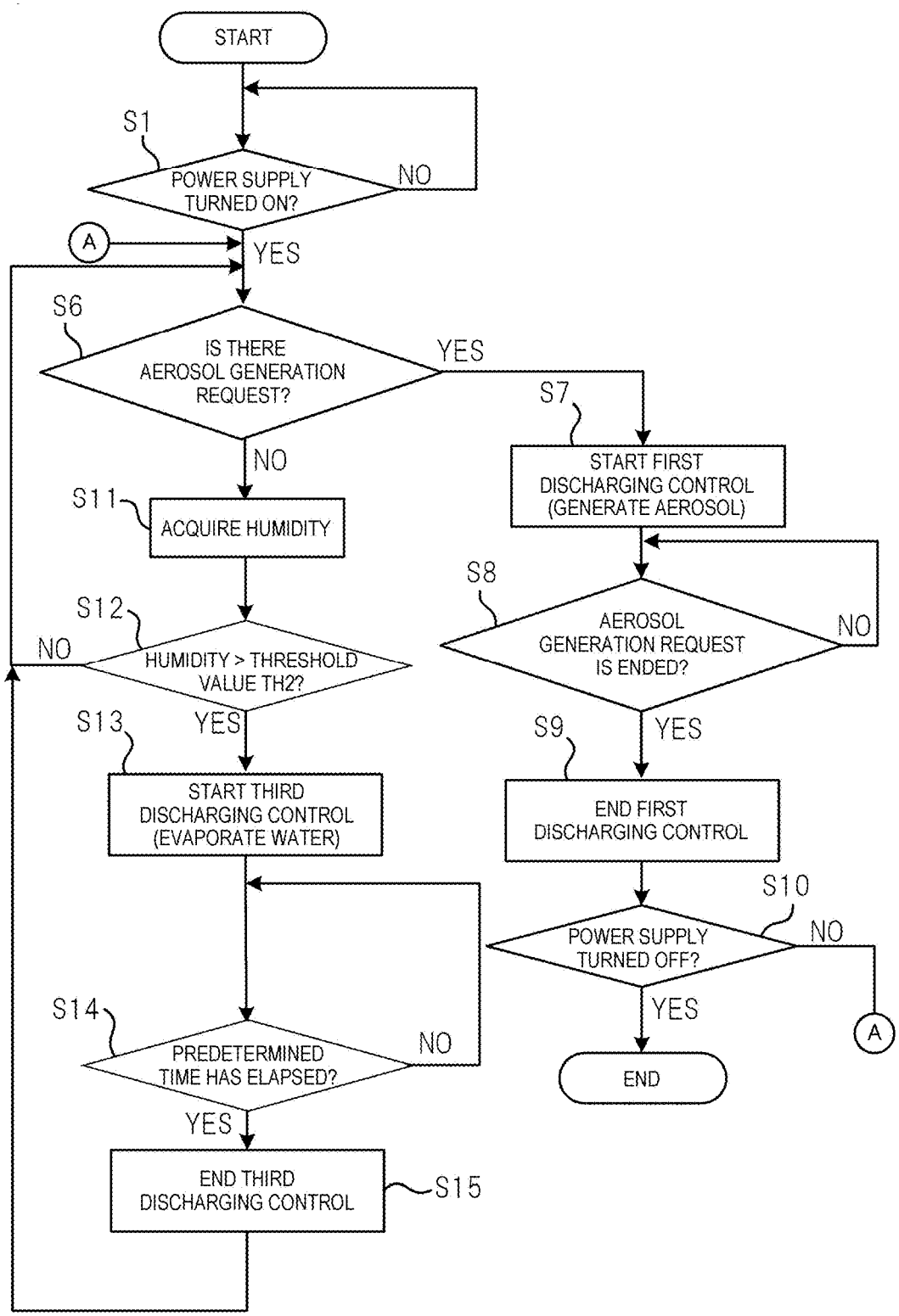
FIG. 8 is a flowchart for explaining a second modification of the operation of the aerosol generation device shown in FIG. 1.

FIG. 8 is a flowchart for explaining a second modification of the operation of the aerosol generation device 1 shown in FIG. 1. The flowchart shown in FIG. 8 is the same as FIG. 6 except that step S2 to step S5 are deleted and step S11 to step S15 are added. Hereinafter, the changes will be mainly described.

When the power supply of the power supply unit 10 is turned on (step S1: YES), the MCU 50 determines whether the aerosol generation request is started (step S6). When the aerosol generation request is started (step S6: YES), processes of step S7 and subsequent steps are performed.

When the aerosol generation request is not started (step S6: NO), the MCU 50 acquires information on humidity around the power supply unit 10 (step S11). A method of acquiring the information on humidity is adopted as desired, and for example, the following first acquisition method, second acquisition method, and third acquisition method can be adopted.

The first acquisition method is a method of providing a humidity sensor inside the power supply unit 10 and acquiring detection information of the humidity sensor. The second acquisition method is a method of providing, inside the power supply unit 10, an interface capable of communicating with an external device (for example, a smartphone of the user) connected to a service server that provides humidity information, and acquiring humidity information of a location where the aerosol generation device 1 is present from the service server via the external device. The third acquisition method is a method of providing a barometric pressure sensor inside the power supply unit 10, and estimating humidity based on detection information of the barometric pressure sensor and detection information of a temperature sensor provided inside the power supply unit 10.

After acquiring the humidity information in step S11, the MCU 50 determines whether the acquired humidity exceeds a threshold value TH2 (step S12). When the humidity is equal to or lower than the threshold value TH2 (step S12: NO), the MCU 50 returns the process to step S6.

When the humidity exceeds the threshold value TH2 (step S12: YES), the MCU 50 starts the third discharging control (step S13). When a predetermined time (for example, 10 seconds to 15 seconds) elapses after the start of the third discharging control (step S14: YES), the MCU 50 ends the third discharging control (step S15). After step S15, the process proceeds to step S6.

According to the operation of the second modification described above, the third discharging control is started in step S13 only when the humidity around the power supply unit 10 is high and it is assumed that a large amount of water is present in the vicinity of the first load 21. In this way, by performing the third discharging control only when necessary, power consumption can be reduced as compared with the operations of FIGS. 6 and 7.

In the operation of FIG. 8, timing when the third discharging control started in step S13 is ended may be, as described with reference to FIG. 7, the earlier one of a time point when the variation amount of the electric resistance value of the first load 21 becomes equal to or higher than the threshold value TH1 and a time point when a predetermined time has elapsed since the start of the third discharging control. In addition, humidity in the vicinity of the first load 21 may be acquired, and the third discharging control may be ended when the humidity becomes low.

(Third Modification of Operation of Aerosol Generation Device)

In the description of the operation of the aerosol generation device 1 so far, the third discharging control is performed in a state where the power supply of the power supply unit 10 is turned on. However, the third discharging control may be performed in a state where power can be supplied from an external power supply (a mobile battery, an outlet, or the like) to the power source 12. The state where the power can be supplied from the external power supply to the power supply 12 is a state where the charging terminal 43 and the external power supply are electrically connected to each other, in other words, a state where the power supply 12 can be charged.

Figure 9:
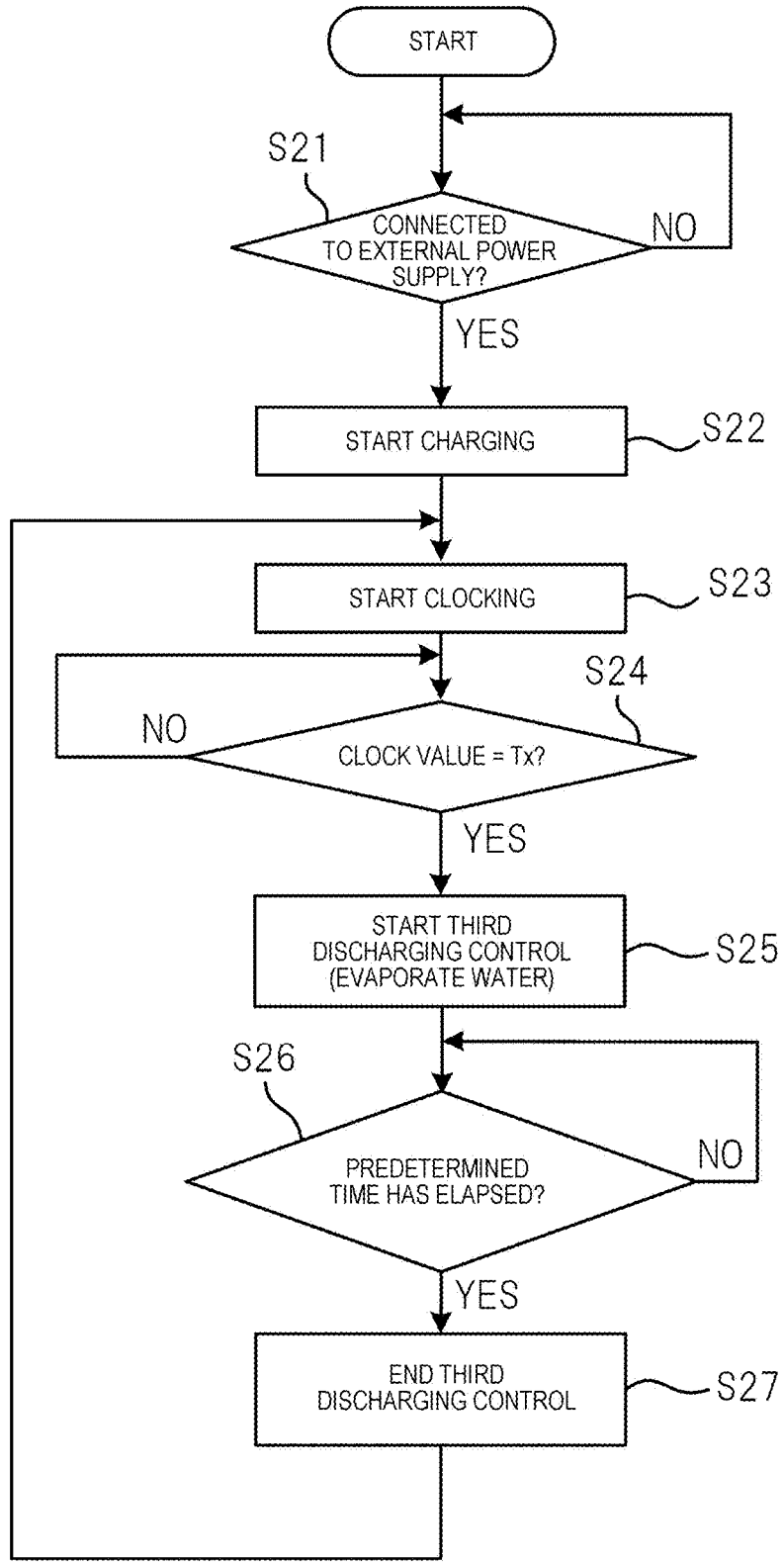
FIG. 9 is a flowchart for explaining a third modification of the operation of the aerosol generation device shown in FIG. 1.

FIG. 9 is a flowchart for explaining a third modification of the operation of the aerosol generation device 1 shown in FIG. 1. The MCU 50 determines whether the charging terminal 43 of the power supply unit 10 is connected to the external power supply (step S21). A state where the charging terminal 43 is connected to the external power supply refers to a state where power can be supplied from the external power supply to the charging terminal 43.

When the charging terminal 43 is connected to the external power supply (step S21: YES), the MCU 50 starts charging the power supply 12 with the power supplied from the external power supply (step S22). When the charging is started, the MCU 50 resets a built-in timer to an initial value (=0) and starts clocking (step S23).

The MCU 50 determines whether a clock value of the timer is a predetermined value Tx (step S24), and, when the clock value is the predetermined value Tx (step S24: YES), the MCU 50 starts the third discharging control (step S25).

When a predetermined time (for example, 10 seconds to 15 seconds) elapses since the start of the third discharging control (step S26: YES), the MCU 50 ends the third discharging control (step S27). After step S27, the process proceeds to step S23. In this way, in a charging period of the power source 12, the third discharging control is performed every time when the time of the predetermined value Tx elapses. The predetermined value Tx is preferably set to a time that is long enough for water to be adsorbed in the vicinity of the first load 21, and is set to a value as desired, such as 1 hour, 2 hours, 4 hours, or 8 hours, for example.

According to the operation of the third modification described above, the water in the vicinity of the first load 21 can be evaporated during the charging period of the power supply 12, which is a period when the user does not use the aerosol generation device 1. Therefore, the water in the vicinity of the first load 21 can be evaporated without awareness of the user. In addition, since the power supply 12 is charged over a certain period of time, the amount of water in the vicinity of the first load 21 is likely to increase. By periodically performing the third discharging control in such a period when the amount of water is likely to increase, the water in the vicinity of the first load 21 can be effectively removed.

In the operation of FIG. 9, timing when the third discharging control started in step S25 is ended may be, as described with reference to FIG. 7, the earlier one of the time point when the variation amount of the electric resistance value of the first load 21 becomes equal to or higher than the threshold value TH1 and the time point when the predetermined time has elapsed since the start of the third discharging control. Alternatively, as described with reference to FIG. 8, the third discharging control may be ended at timing when the humidity in the vicinity of the first load 21 becomes equal to or lower than the threshold value TH2. The processes of steps S24 to S27 shown in FIG. 9 may be performed only when the humidity around the power supply unit 10 exceeds the threshold value TH2.

The predetermined value Tx may be variably controlled in accordance with the humidity around the power supply unit 10. For example, when the humidity is high, the predetermined value Tx is set to be smaller than when the humidity is low. In this way, in a situation where the humidity is high and water is likely to gather in the vicinity of the first load 21, the third discharging control can be performed at a high frequency, and the water can be effectively removed. The predetermined value Tx may be a relatively small value in the period when the power supply 12 is being charged, and may be a relatively large value in a period after the charging of the power supply 12 is completed. In this way, it is possible to shorten a time until the charging of the power supply 12 is completed.

In the state where the charging terminal 43 and the external power supply are connected to each other, the third discharging control may not be performed while the power supply 12 is being charged, and the third discharging control may be performed only during a non-use period after the charging of the power supply 12 is completed. By doing so, the charging can be completed at an early stage. In addition, the water in the vicinity of the first load 21 can be evaporated in the non-use period after the completion of the charging. In the power supply unit 10, it is desirable that the first discharging control and the second discharging control are not performed in the state where the charging terminal 43 and the external power supply are connected to each other.

In the description so far, the MCU 50 can evaporate the water present in the vicinity of the first load 21 by performing the third discharging control in the specific period when the aerosol generation and the detection of the electric resistance value R1 of the first load 21 are not performed. As a modification, the MCU 50 may evaporate the water present in the vicinity of the first load 21 by performing fourth discharging control in the specific period when the aerosol generation and the detection of the electric resistance value R1 of the first load 21 are not performed. In the fourth discharging control, in FIG. 5, the switch SW3 is controlled to be in the cut-off state and the switch SW1 is controlled to be in the conductive state, which is very similar to control contents of the first discharging control. A difference between the first discharging control and the fourth discharging control is that duration of the fourth discharging control is sufficiently shorter than duration of the first discharging control. Specifically, the fourth discharging control is performed for a period of time required for the temperature of the first load 21 to reach about 100° C., which is necessary for evaporation of water. As described above, by discharging electricity to the first load 21 for a short time without passing through the resistance element Rs by the fourth discharging control and thus evaporating the water in the vicinity of the first load 21, the aerosol generated when the first discharging control is performed thereafter can still be prevented from containing a large amount of water, and thus the decrease in the flavor can be prevented.

In the present specification, at least the following matters are described. Although corresponding constituent elements or the like in the above-described embodiment are shown in parentheses, the present invention is not limited thereto.

(1) A power supply unit for an aerosol generation device includes:

a power supply (power supply 12) configured to discharge electricity to a first load (first load 21) that heats an aerosol source (aerosol source 22);

a resistance element (resistance element Rs) configured to be connected in series to the first load and configured to detect an electric resistance value of the first load; and a processing device (processor of the MCU 50).

The processing device performs first discharging control of discharging electricity from the power supply to the first load in order to generate aerosol, and second discharging control of discharging electricity from the power supply to a series circuit formed of the first load and the resistance element in order to detect the electric resistance value of the first load, and in a specific period, other than a period when the first discharging control and the second discharging control are performed, the processing device performs third discharging control of discharging electricity from the power supply to the series circuit.

According to (1), the discharging to the series circuit formed of the first load and the resistance element is performed in the specific period when the aerosol generation and the detection of the electric resistance value of the first load are not performed. Therefore, it is possible to heat the first load and evaporate water present in the vicinity of the first load by the discharging. By evaporating the water in the vicinity of the first load, aerosol generated when the first discharging control is performed can be prevented from containing water, and thus a decrease in a flavor can be prevented.

(2) The power supply unit for an aerosol generation device according to (1), in which an electric resistance value of the resistance element and a voltage to be supplied to the series circuit during the third discharging control are determined in such a manner that a temperature of the first load is in a range of 30° C. or more and less than 100° C. in a state where the third discharging control is performed.

According to (2), since the temperature of the first load does not become high in the state where the third discharging control is performed, the water in the vicinity of the first load can be evaporated without awareness of a user. In addition, it is possible to prevent the temperature of the power supply unit from being increased when no inhalation is performed, and thus provide a sense of security to the user.

(3) The power supply unit for an aerosol generation device according to (1) or (2), in which the processing device performs the third discharging control in a state where supply of power from an external power supply to the power supply is enabled.

(4) The power supply unit for an aerosol generation device according to (3), in which the processing device performs the third discharging control during charging of the power supply.

According to (3) and (4), water can be evaporated during charging of the power supply, which is a period when the user does not use the aerosol generation device. Therefore, water in the vicinity of the first load can be evaporated without awareness of the user. In addition, since the power supply is charged over a certain period of time, an amount of water in the vicinity of the first load is likely to increase. By performing the third discharging control in such a period when the amount of water is likely to increase, the water in the vicinity of the first load can be effectively removed.

(5) The power supply unit for an aerosol generation device according to (1) or (2), in which the processing device performs the third discharging control after the power supply unit is activated.

According to (5), water can be evaporated while the user is preparing for an inhalation after power is turned on. Therefore, water in the vicinity of the first load can be evaporated without awareness of the user. In a state where the power supply is not activated, it is considered that the power supply unit is left for a certain period of time, and there is a high possibility that an amount of water in the vicinity of the first load is increased. Therefore, the water in the vicinity of the first load can be effectively removed by evaporating the water after the power supply is activated.

(6) The power supply unit for an aerosol generation device according to (5), in which the processing device performs the third discharging control during a period from when the power supply unit is activated to when the first discharging control is performed for a first time.

According to (6), water can be evaporated before start of first aerosol generation. Therefore, a sufficient flavor can be provided to the user from a first inhalation after power is turned on.

(7) The power supply unit for an aerosol generation device according to (5) or (6), in which the processing device controls a time of performing the third discharging control based on an elapsed time (elapsed time T1) between a time point when aerosol generation of a last time is ended and a time point when the third discharging control is started.

According to (7), the time of performing the third discharging control is determined based on the elapsed time that is highly correlated with the amount of water in the vicinity of the first load. Therefore, it is possible to perform appropriate discharging according to the amount of water, and thus power can be efficiently used.

(8) The power supply unit for an aerosol generation device according to (1) or (2), in which the processing device is configured to acquire humidity around the power supply unit, and the processing device performs the third discharging control when the humidity exceeds a threshold value (threshold value TH2).

According to (8), the third discharging control is performed only when it is assumed that there is a large amount of water in the vicinity of the first load. Therefore, power consumption can be reduced.

(9) The power supply unit for an aerosol generation device according to any one of (1) to (6) and (8), in which the processing device controls a timing when the third discharging control is ended based on a variation amount of the electric resistance value of the first load when the third discharging control is performed.

According to (9), the time of performing the third discharging control can be appropriately determined. In a case where water is contained in the first load, when electricity is discharged to the first load to evaporate the water, the temperature of the first load is decreased due to heat of vaporization caused by the evaporation, and the variation amount of the electric resistance value of the first load is increased. Therefore, by ending the third discharging control when the variation amount is increased, it is possible to prevent the discharging from being continued in a state where there is no water and thus reduce power consumption.

(10) The power supply unit for an aerosol generation device according to (9), in which the processing device ends the third discharging control when the variation amount exceeds a threshold value (threshold value TH1).

According to (10), since the third discharging control is ended when the variation amount is increased, it is possible to prevent the discharging from being continued in a state where there is no water and thus reduce power consumption.

(11) The power supply unit for an aerosol generation device according to any one of (1) to (10) further includes:

a body portion (power supply unit case 11) where an accommodating member (first cartridge 20) accommodating the aerosol source is freely attachable and detachable.

The processing device performs the third discharging control in a state where the accommodating member is attached to the body portion.

According to (11), aerosol can be generated in a state where water contained in the aerosol source accommodating member is evaporated. Therefore, a desired flavor can be provided to the user.

(12) A power supply unit for an aerosol generation device includes: a power supply (power supply 12) configured to discharge electricity to a first load (first load 21) that heats an aerosol source (aerosol source 22); and a processing device (processor of the MCU 50).

The processing device performs first discharging control of discharging electricity from the power supply to the first load in order to generate aerosol, and third discharging control of discharging electricity from the power supply to the first load with power lower than that in the first discharging control, and the processing device performs the third discharging control in a state where supply of power from an external power supply to the power supply is enabled.

(13) The power supply unit for an aerosol generation device according to (12), in which the processing device performs the third discharging control during charging of the power supply.

According to (12) and (13), the third discharging control is performed during charging of the power supply, which is a period when the user does not use the aerosol generation device. Water present in the vicinity of the first load can be evaporated. Therefore, the water in the vicinity of the first load can be evaporated without awareness of the user. In addition, since the power supply is charged over a certain period of time, an amount of water in the vicinity of the first load is likely to increase. By performing the third discharging control in such a period when the amount of water is likely to increase, the water in the vicinity of the first load can be effectively removed.

(14) A power supply unit for an aerosol generation device includes: a power supply (power supply 12) configured to discharge electricity to a first load (first load 21) that heats an aerosol source (aerosol source 22); and a resistance element (resistance element Rs) configured to be connected in series to the first load and configured to detect an electric resistance value of the first load; and a processing device (processor of the MCU 50).

The processing device performs first discharging control of discharging electricity from the power supply to the first load in order to generate aerosol, and second discharging control of discharging electricity from the power supply to a series circuit formed of the first load and the resistance element in order to detect the electric resistance value of the first load, and in a specific period other than a period when the first discharging control and the second discharging control are performed, the processing device performs fourth discharging control of discharging electricity from the power supply to the first load without passing through the resistance element.

According to (14), the discharging to the first load is performed in the specific period when the aerosol generation and the detection of the electric resistance value of the first load are not performed. Therefore, it is possible to heat the first load and evaporate water present in the vicinity of the first load by the discharging. By evaporating the water in the vicinity of the first load, aerosol generated when the first discharging control is performed can be prevented from containing water, and thus a decrease in a flavor can be prevented.

What is claimed is:

1. A power supply unit for an aerosol generation device, comprising:

- a power supply configured to discharge electricity to a first load that heats an aerosol source;
- a resistance element configured to be connected in series to the first load and configured to detect an electric resistance value of the first load; and
- a processing device configured to perform:
  - first discharging control of discharging electricity from the power supply to the first load in order to generate aerosol,
  - second discharging control of discharging electricity from the power supply to a series circuit formed of the first load and the resistance element in order to detect the electric resistance value of the first load; and
  - third discharging control in a specific period other than a period when the first discharging control and the second discharging control are performed, wherein the third discharging control corresponds to discharging electricity from the power supply to the series circuit in order to evaporate water in a vicinity of the first load,
  - wherein the third discharging control is performed in a state where supply of power from an external power supply to the power supply is enabled and during charging of the power supply,
  - wherein the processing device performs the third discharging control after the power supply unit is activated, and
  - wherein the processing device performs the third discharging control during a period from when the power supply unit is activated to when the first discharging control is performed for a first time.

2. The power supply unit for an aerosol generation device according to claim 1, wherein

- an electric resistance value of the resistance element and a voltage to be supplied to the series circuit during the third discharging control are determined in such a manner that a temperature of the first load is in a range of 30° C. or more and less than 100° C. in a state where the third discharging control is performed.

3. The power supply unit for an aerosol generation device according to claim 1, wherein:

- the processing device is configured to acquire humidity around the power supply unit; and
- the processing device is configured to perform the third discharging control when the humidity exceeds a threshold value.

4. The power supply unit for an aerosol generation device according to claim 1, further comprising:

- a body portion where an accommodating member accommodating the aerosol source is freely attachable and detachable, wherein
- the processing device is configured to perform the third discharging control in a state where the accommodating member is attached to the body portion.

5. A power supply unit for an aerosol generation device, comprising:

- a power supply configured to discharge electricity to a first load that heats an aerosol source;
- a resistance element configured to be connected in series to the first load and configured to detect an electric resistance value of the first load; and
- a processing device configured to perform:
  - first discharging control of discharging electricity from the power supply to the first load in order to generate aerosol,
  - second discharging control of discharging electricity from the power supply to a series circuit formed of the first load and the resistance element in order to detect the electric resistance value of the first load; and
  - third discharging control in a specific period other than a period when the first discharging control and the second discharging control are performed, wherein the third discharging control corresponds to discharging electricity from the power supply to the series circuit in order to evaporate water in a vicinity of the first load,
  - wherein the third discharging control is performed in a state where supply of power from an external power supply to the power supply is enabled and during charging of the power supply,
  - wherein the processing device performs the third discharging control after the power supply unit is activated, and
  - wherein the processing device is configured to control a time of performing the third discharging control based on an elapsed time between a time point when aerosol generation of a last time is ended and a time point when the third discharging control is started.

6. A power supply unit for an aerosol generation device, comprising:
   a power supply configured to discharge electricity to a first load that heats an aerosol source;
   a resistance element configured to be connected in series to the first load and configured to detect an electric resistance value of the first load; and
   a processing device configured to perform:
      first discharging control of discharging electricity from the power supply to the first load in order to generate aerosol,
      second discharging control of discharging electricity from the power supply to a series circuit formed of the first load and the resistance element in order to detect the electric resistance value of the first load; and
      third discharging control in a specific period other than a period when the first discharging control and the second discharging control are performed, wherein the third discharging control corresponds to discharging electricity from the power supply to the series circuit in order to evaporate water in a vicinity of the first load,
   wherein the third discharging control is performed in a state where supply of power from an external power supply to the power supply is enabled and during charging of the power supply,
   wherein the processing device is configured to control a timing when the third discharging control is ended based on a variation amount of the electric resistance value of the first load when the third discharging control is performed.

7. The power supply unit for an aerosol generation device according to claim 6, wherein
   the processing device is configured to end the third discharging control when the variation amount exceeds a threshold value.

* * * * *